(12) United States Patent
Todd et al.

(10) Patent No.: US 12,140,192 B2
(45) Date of Patent: Nov. 12, 2024

(54) BIFURCATED HEAT SHIELD ATTACHMENT BRACKET

(71) Applicant: GOODRICH CORPORATION, Charlotte, NC (US)

(72) Inventors: Timothy Kyle Todd, Lebanon, OH (US); Nathaniel John Herrmann, Springfield, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 431 days.

(21) Appl. No.: 17/549,676

(22) Filed: Dec. 13, 2021

(65) Prior Publication Data

US 2023/0184305 A1    Jun. 15, 2023

(51) Int. Cl.
| | |
|---|---|
| *F16D 65/847* | (2006.01) |
| *B64C 25/34* | (2006.01) |
| *B64C 25/42* | (2006.01) |
| *F16D 65/12* | (2006.01) |
| *F16D 65/78* | (2006.01) |

(52) U.S. Cl.
CPC ............ *F16D 65/847* (2013.01); *B64C 25/34* (2013.01); *B64C 25/42* (2013.01); *F16D 65/128* (2013.01); *F16D 2065/785* (2013.01)

(58) Field of Classification Search
CPC ......... B64C 25/36; B64C 25/42; B64C 25/44; B64C 25/001; F16D 65/847; F16D 65/128; F16D 55/36; F16D 2065/785; B60B 2900/513; B60C 23/18; B60C 23/19
See application file for complete search history.

(56) References Cited

U.S. PATENT DOCUMENTS

| | | | |
|---|---|---|---|
| 5,002,342 A | 3/1991 | Dyko | |
| 5,851,056 A * | 12/1998 | Hyde | B60B 19/10 |
| | | | 188/264 G |
| 9,908,375 B2 | 3/2018 | Baden et al. | |
| 10,330,163 B2 | 6/2019 | French et al. | |
| 2003/0102710 A1* | 6/2003 | Thorp | F16D 55/36 |
| | | | 301/6.1 |
| 2019/0113092 A1* | 4/2019 | French | F16D 65/128 |
| 2020/0189727 A1* | 6/2020 | French | F16D 65/0081 |
| 2021/0018055 A1* | 1/2021 | Miller | F16D 55/36 |
| 2021/0197633 A1 | 7/2021 | French | |

FOREIGN PATENT DOCUMENTS

| | | | | |
|---|---|---|---|---|
| EP | 1516754 A1 * | 3/2005 | ............ | F16D 55/36 |
| EP | 1780057 A2 * | 5/2007 | ............ | F16D 55/36 |

OTHER PUBLICATIONS

European Patent Office, European Search Report dated Sep. 14, 2023 in Application No. 22211502.4.

* cited by examiner

*Primary Examiner* — Kip T Kotter
(74) *Attorney, Agent, or Firm* — SNELL & WILMER L.L.P.

(57) ABSTRACT

A heat shield assembly for a wheel is disclosed. The heat shield assembly includes a heat shield having a pair of heat shield ends. A bifurcated seam mounting bracket includes a first bracket section that is fixed relative one of the heat shield ends, along with a second bracket section that is fixed relative to the other of the heat shield ends. The second bracket section may be directly mounted to the heat shield. A seam clasp section may be directly mounted to both the heat shield and the first bracket section such that the first bracket section is indirectly mounted to the heat shield.

18 Claims, 14 Drawing Sheets

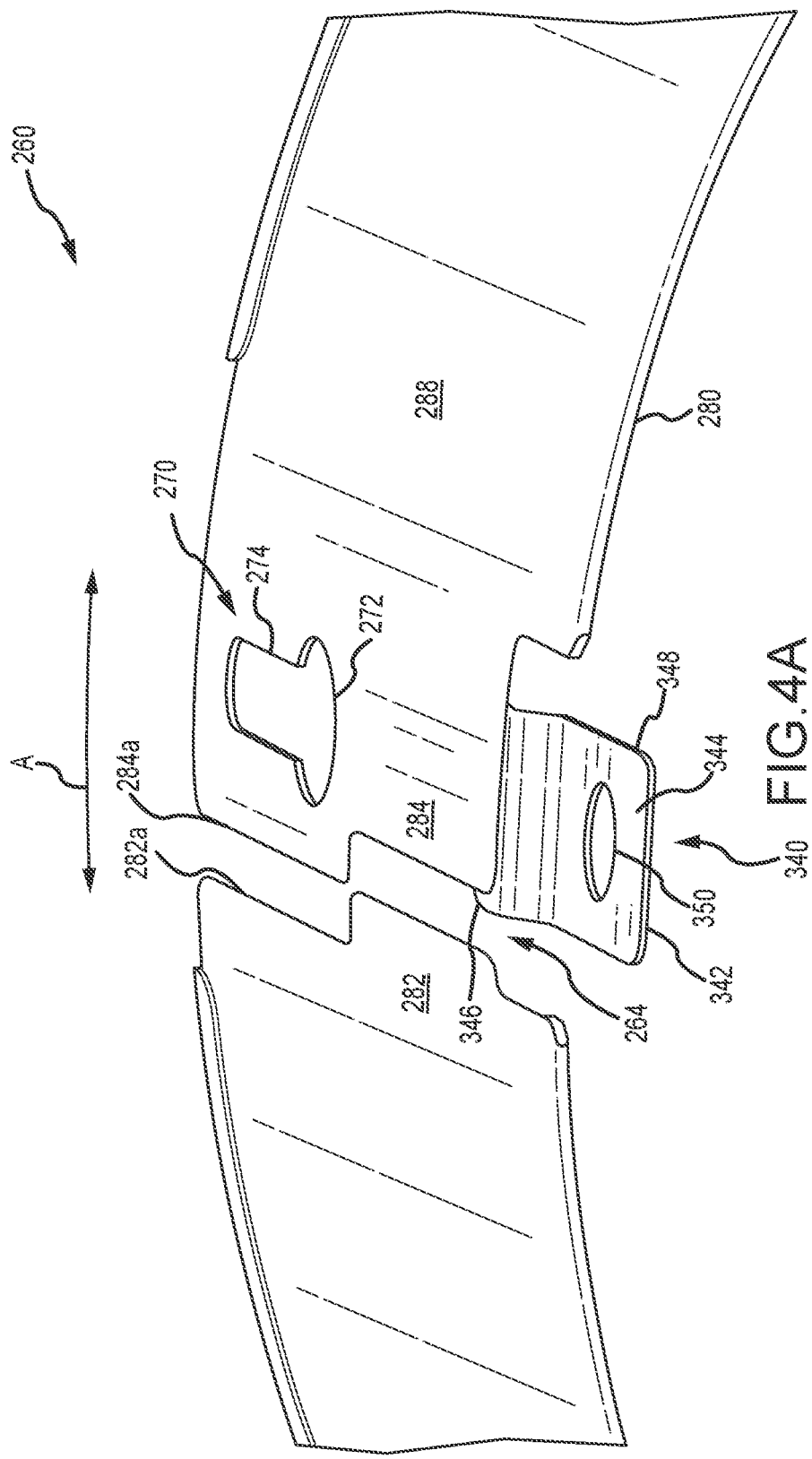

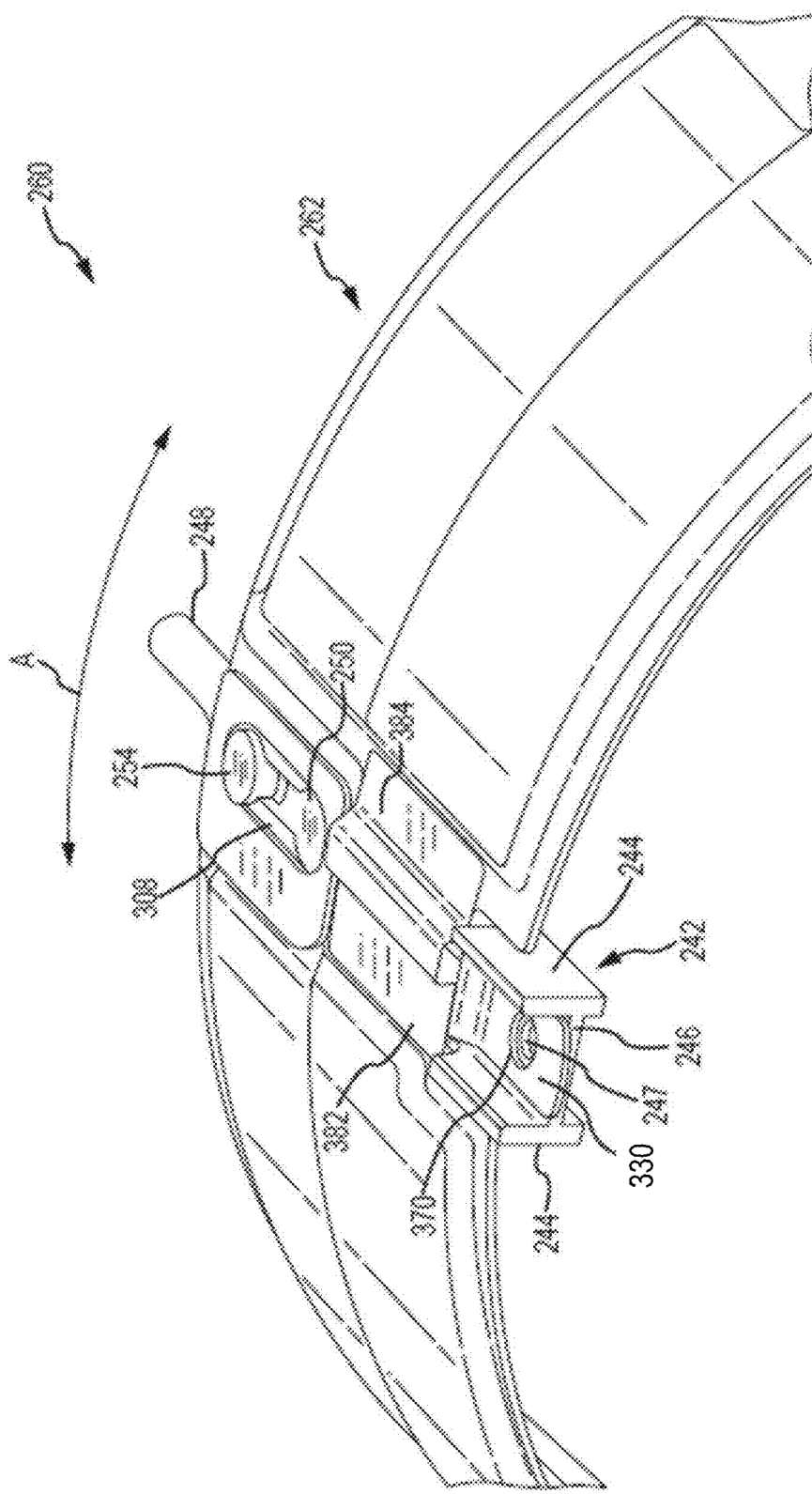

BIFURCATED HEAT SHIELD ATTACHMENT BRACKET

FIELD

The present disclosure generally relates to the field of wheel assemblies and, more particularly, to heat shields for wheel assemblies.

BACKGROUND

Aircraft typically utilize brake systems on wheels to slow or stop the aircraft during landings, taxiing, and rejected takeoffs. The brake systems generally employ a brake stack comprising a series of friction disks that may be forced into sliding contact with one another during brake actuation to slow or stop the aircraft. Under various conditions, brake actuation may generate high temperatures in the vicinity of the brake stack that can adversely impact or damage wheels or tires mounted thereon. Positioning a heat shield between the brake stack and the wheel can mitigate thermal damage to the wheel.

SUMMARY

A heat shield assembly is presented herein. Both the configuration of such a heat shield assembly and the assembly of such a heat shield assembly are within the scope of this Summary.

In one aspect the heat shield assembly includes a heat shield and a bifurcated seam mounting bracket. The bifurcated seam mounting bracket includes a first bracket section and a separate second bracket section that are adjacent one another but are mounted to different portions of the heat shield. In one arrangement, the first bracket section may be disposed in overlying relation to the second bracket section, with the second bracket section being directly mounted to an inner surface of the heat shield, with the first bracket section being disposed on an outer surface of the heat shield but being indirectly mounted to the heat shield by a first seam clasp section that is mounted directly to the heat shield and to the first bracket section, and with a fastener aperture extending through each of the first and second bracket sections. In another arrangement, the first and second bracket sections are disposed at least generally alongside one another, with the second bracket section being directly mounted to an outer surface of the heat shield, with the first bracket section being disposed on an outer surface of the heat shield but being indirectly mounted to the heat shield by a first seam clasp section that is mounted directly to the heat shield and to the first bracket section, and with the first and second bracket sections each including an aperture section that collectively define a fastener aperture.

In another aspect the heat shield assembly includes a heat shield and a bifurcated seam mounting bracket. The heat shield includes an inner heat shield section and an outer heat shield section. The bifurcated seam mounting bracket includes a first bracket section and a separate second bracket section that are adjacent one another but are mounted to different portions of the heat shield. In one arrangement, the first bracket section may be disposed in overlying relation to the second bracket section, with the second bracket section being directly mounted to an inner surface of the inner heat shield section, with the first bracket section being disposed on an outer surface of the inner heat shield section but being indirectly mounted to the heat shield by a first seam clasp section that is mounted directly to the outer heat shield section and to the first bracket section, and with a fastener aperture extending through each of the first and second bracket sections. In another arrangement, the first and second bracket sections are disposed at least generally alongside one another, with the second bracket section being directly mounted to an outer surface of the inner heat shield section, with the first bracket section being disposed on an outer surface of the inner heat shield section but being indirectly mounted to the heat shield section by a first seam clasp section that is mounted directly to the outer heat shield section and to the first bracket section, and with the first and second bracket sections each including an aperture section that collectively define a fastener aperture.

Various aspects of the present disclosure are also addressed by the following examples and in the noted combinations:

1. A heat shield assembly comprising:
    a heat shield comprising a first heat shield end and a second heat shield end; and
    a seam mounting bracket comprising a first bracket section and a separate second bracket section, wherein said first bracket section is maintained in a fixed position relative to said first heat shield end and said second bracket section is maintained in a fixed position relative to said second heat shield end.
2. The heat shield assembly of example 1, wherein said first bracket section is disposed in overlying relation to said second bracket section.
3. The heat shield assembly of example 2, wherein said first bracket section and said second bracket section each comprise a fastener aperture, wherein said fastener aperture of said first bracket section is aligned with said fastener aperture of said second bracket section.
4. The heat shield assembly of example 1, wherein said first bracket section and said second bracket section are disposed in side-by-side relation.
5. The heat shield assembly of example 4, wherein said first bracket section and said second bracket section each comprise a fastener aperture section, wherein said fastener aperture section of said first bracket section adjoins said fastener aperture section of said second bracket section to collectively define a single fastener aperture.
6. The heat shield assembly of example 1, wherein said heat shield comprises an inner heat shield section and an outer heat shield section.
7. The heat shield assembly of example 6, wherein said first bracket section is disposed in overlying relation to said second bracket section, and wherein said second bracket section is attached to an inner surface of said inner heat shield section associated with said second heat shield end.
8. The heat shield assembly of example 7, further comprising:
    a first seam clasp section disposed on both an outer surface of a portion of said outer heat shield section and an outer surface of at least part of said first bracket section that are each associated with said first heat shield end, and wherein said first seam clasp section is mounted to each of said outer heat shield section and said first bracket section.
9. The heat shield assembly of example 8, further comprising:
    a second seam clasp section disposed on an outer surface of a portion of said outer heat shield section that is associated with said second heat shield end, wherein said second seam clasp section is mounted to said outer heat shield section.

10. The heat shield assembly of example 9, further comprising:
a first configuration where said first seam clasp section and said second seam clasp section are interconnected to interconnect said first heat shield end with said second heat shield end; and
a second configuration where said first seam clasp section and said second seam clasp section are disconnected to disconnect said first heat shield end from said second heat shield end.

11. A wheel assembly comprising a wheel and the heat shield assembly of any of examples 1-10, wherein said heat shield assembly is detachably connected to said wheel.

12. A heat shield assembly comprising:
a heat shield comprising:
an inner heat shield section comprising a first inner heat shield end and a second inner heat shield end, wherein said inner heat shield section extends about a reference axis proceeding from said first inner heat shield end to said second inner heat shield end; and
an outer heat shield section positioned radially outwardly, relative to said reference axis, of said inner heat shield section, comprising a first outer heat shield end and a second outer heat shield end, and further comprising an outer surface, wherein said outer heat shield section extends about said reference axis proceeding from said first outer heat shield end to said second outer heat shield end;
a seam mounting bracket comprising a first bracket section and a separate second bracket section, wherein said second bracket section is mounted to said inner heat shield section at a second end section of said inner heat shield section that comprises said second inner heat shield end; and
a seam clasp comprising a first seam clasp section and a second seam clasp section, wherein said first seam clasp section is disposed on both said outer surface of a first end section of said outer heat shield section that comprises said first outer heat shield end and an outer surface of at least part of said first bracket section, wherein said first seam clasp section is mounted to each of said outer heat shield section and said first bracket section, wherein said second seam clasp section is disposed on said outer surface of a second end section of said outer heat shield section that comprises said second outer heat shield end, wherein said second seam clasp section is mounted to said outer heat shield section.

13. The heat shield assembly of example 12, wherein said first bracket section is disposed in overlying relation to said second bracket section.

14. The heat shield assembly of example 13, wherein said second bracket section is attached to an inner surface of said inner heat shield section.

15. The heat shield assembly of any of examples 13-14, wherein said first bracket section and said second bracket section each comprise a fastener aperture, wherein said fastener aperture of said first bracket section is aligned with said fastener aperture of said second bracket section.

16. The heat shield assembly of example 12, wherein said first bracket section and said second bracket section are disposed in side-by-side relation.

17. The heat shield assembly of example 16, wherein said second bracket section is attached to an outer surface of said inner heat shield section.

18. The heat shield assembly of example 17, wherein said first bracket section disposed on said outer surface of said inner heat shield section.

19. The heat shield assembly of any of examples 16-18, wherein said first bracket section and said second bracket section each comprise a fastener aperture section, wherein said fastener aperture section of said first bracket section adjoins said fastener aperture section of said second bracket section to define a single fastener aperture.

20. The heat shield assembly of any of examples 12-19, further comprising:
a first configuration where said first seam clasp section and said second seam clasp section are interconnected to interconnect a first end section of said inner heat shield section and said second end section of said inner heat shield section and to interconnect said first end section of said outer heat shield section and said second end section of said outer heat shield section, said first end section of said inner heat shield section comprising said first inner heat shield end; and
a second configuration where said first seam clasp section and said second seam clasp section are disconnected to disconnect said first end section of said inner heat shield section from said second end section of said inner heat shield section and to disconnect said first end section of said outer heat shield section from said second end section of said outer heat shield section.

21. The heat shield assembly of any of examples 12-20, wherein said first inner heat shield end and said second inner heat shield end are spaced from one another such that said inner heat shield section does not extend a full 360° about said reference axis, and wherein said first outer heat shield end and said second outer heat shield end are spaced from one another such that said outer heat shield section does not extend a full 360° about said reference axis.

22. A wheel assembly comprising a wheel and the heat shield assembly of any of examples 12-21, wherein said heat shield assembly is detachably connected to said wheel.

23. A method of assembling a heat shield assembly comprising an inner heat shield section and an outer heat shield section, said inner heat shield section comprising a first inner heat shield end and a second inner heat shield end, wherein said inner heat shield section extends about a reference axis proceeding from said first inner heat shield end to said second inner heat shield end, said outer heat shield section being positioned radially outwardly, relative to said reference axis, of said inner heat shield section, comprising a first outer heat shield end and a second outer heat shield end, and further comprising an outer surface, wherein said outer heat shield section extends about said reference axis proceeding from said first outer heat shield end to said second outer heat shield end, said method comprising:
mounting a second bracket section to a second end section of said inner heat shield section that comprises said second inner heat shield end;
disposing a first seam clasp section on both said outer surface of a first end section of said outer heat shield section that comprises said first outer heat shield end and an outer surface of at least part of a first bracket section;

mounting said first seam clasp section to each of said outer heat shield section and said first bracket section;

disposing a second seam clasp section on said outer surface of a second end section of said outer heat shield section that comprises said second outer heat shield end; and mounting said second seam clasp section to said outer heat shield section.

24. The method of example 23, further comprising:
disposing an outer surface of said second bracket section against an inner surface of said second end section of said inner heat shield section prior to said mounting a second bracket section.

25. The method of example 24, further comprising:
disposing said first bracket section in overlying relation to said second bracket section after said mounting a second bracket section.

26. The method of any of examples 24-25, further comprising:
disposing an inner surface of said first bracket section on an outer surface of said second end section of said inner heat shield section prior to said disposing a first seam clasp section.

27. The method of example 23, further comprising:
disposing an inner surface of said second bracket section against an outer surface of said second end section of said inner heat shield section prior to said mounting a second bracket section.

28. The method of example 27, further comprising:
disposing said first bracket section at least generally alongside said second bracket section after said mounting a second bracket section.

29. The method of any of examples 27-28, further comprising:
disposing an inner surface of said first bracket section on an outer surface of said second end section of said inner heat shield section prior to said disposing a first seam clasp section.

30. The method of any of examples 23-29, wherein said mounting a second bracket section, said mounting said first seam clasp section, and said mounting said second seam clasp section each comprise welding.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 4A is a perspective view of a portion of an inner heat shield section of a heat shield and an inner bracket section of a bifurcated seam mounting bracket, all in relation to the heat shield assembly of FIG. 3 and in accordance with various embodiments;

FIG. 5A is a perspective view of a torque bar and the heat shield assembly of FIG. 3, in accordance with various embodiments;

DETAILED DESCRIPTION

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
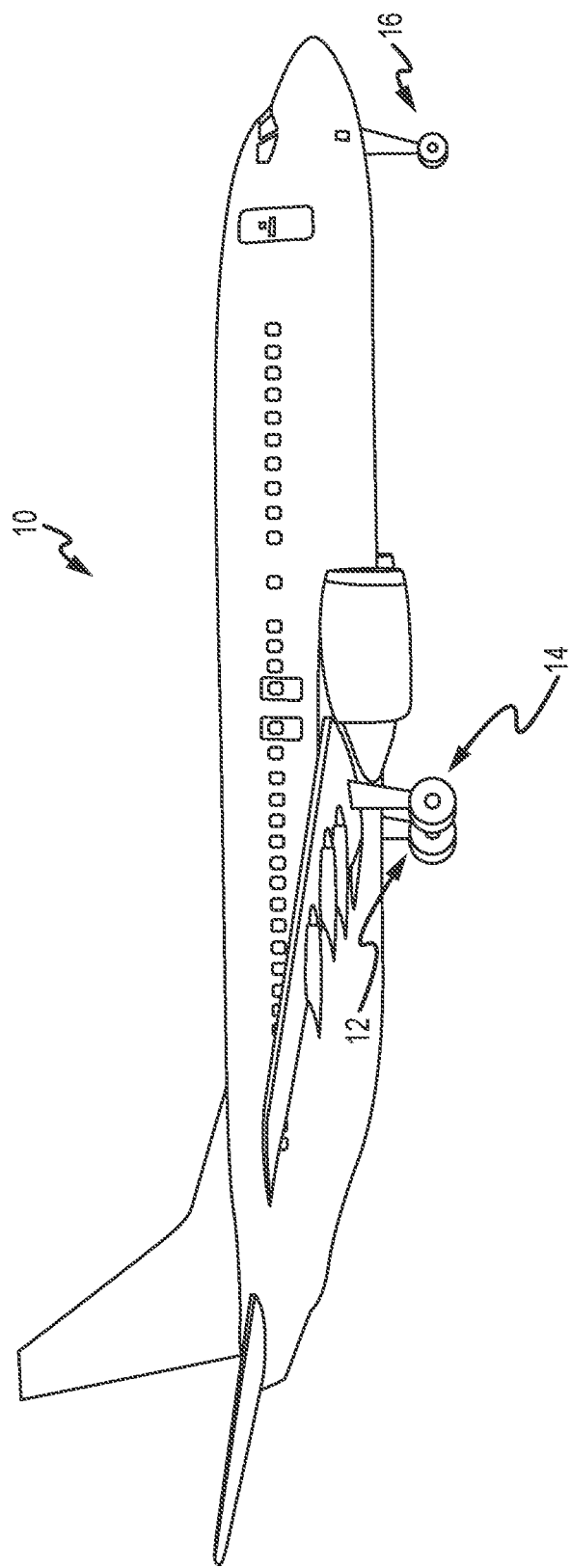
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
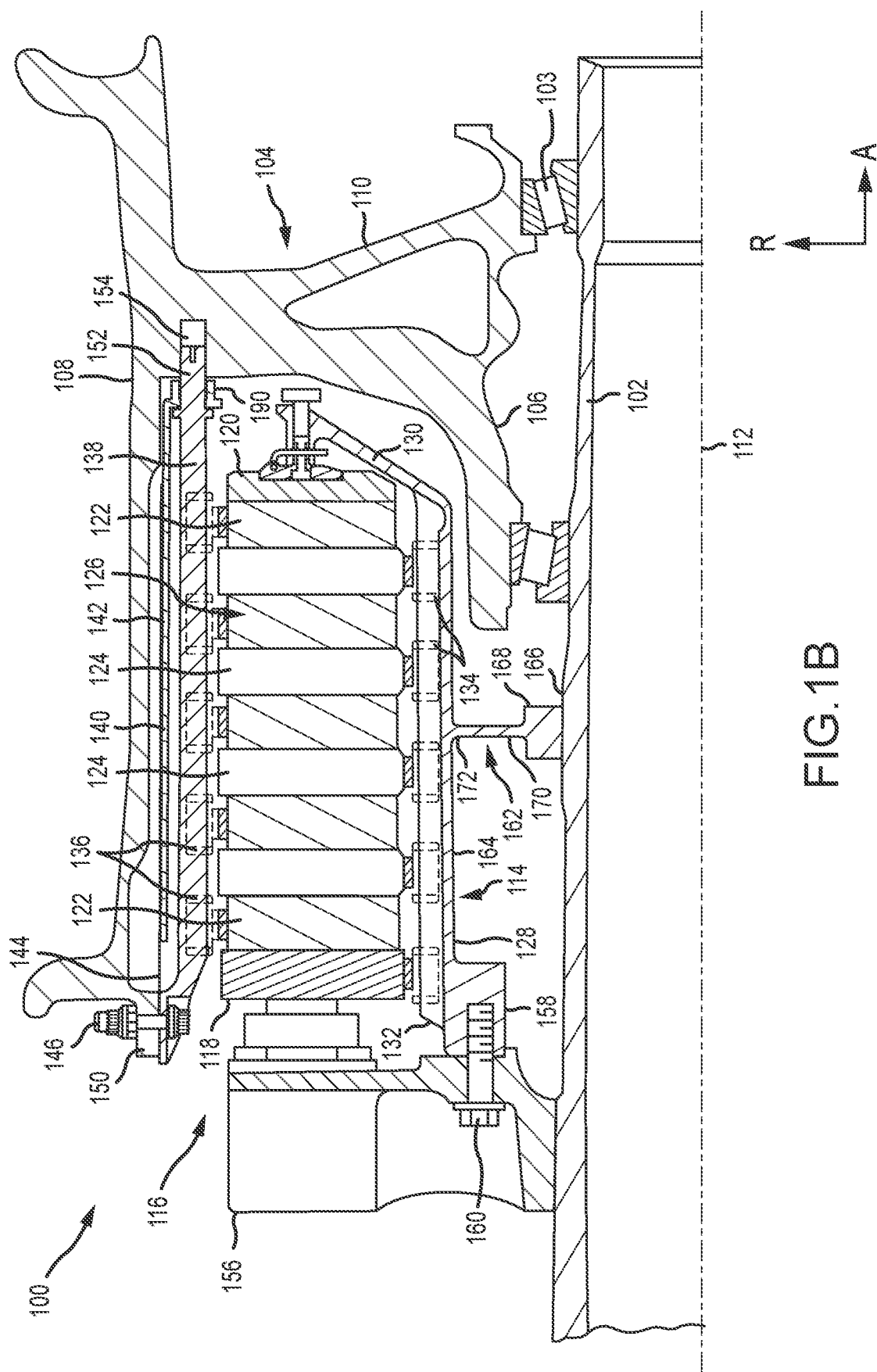
FIG. 1B illustrates a cross-sectional view of a brake assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
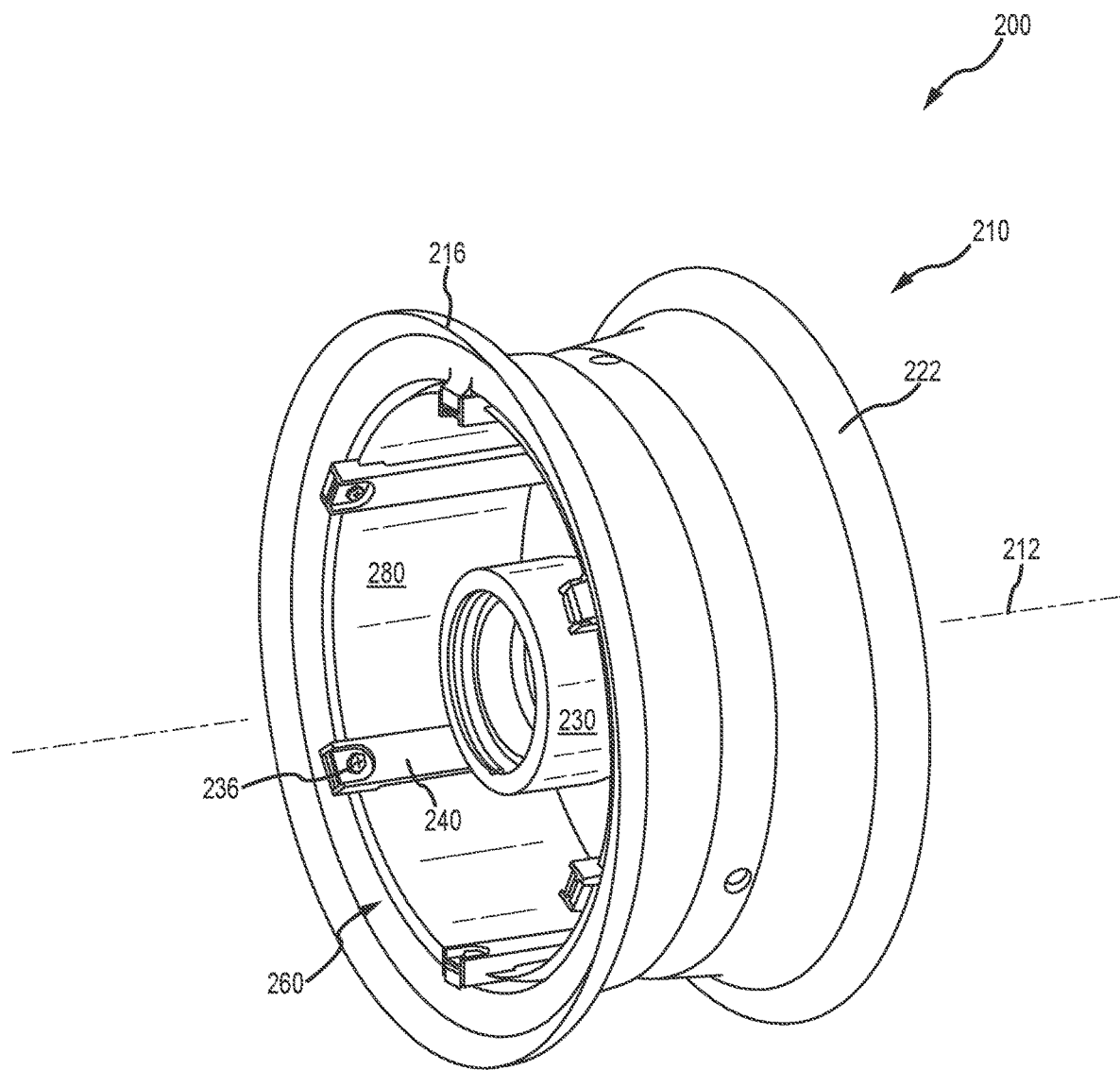
FIG. 2 is a perspective view of a wheel assembly, in accordance with various embodiments.

A wheel assembly is presented in FIG. 2, is identified by reference numeral 200, may be used by the aircraft 10 of FIG. 1A or any other appropriate aircraft, and may be used in conjunction with the braking mechanism 100 of FIG. 1B or any other appropriate braking mechanism/system. Components of the wheel assembly 200 include a wheel 210 and a heat shield assembly 260 that collectively rotate about a rotational axis 212 (e.g., a "reference axis"; the rotational axis 212 hereafter may be referred to as the rotational axis for the wheel assembly 200, for the wheel 210, and/or for the heat shield assembly 260, as all are applicable). The heat shield assembly 260 may be disposed radially outwardly (relative to the rotational axis 212) of a brake mechanism for the wheel 210. A plurality of torque bars 240 are radially spaced about the rotational axis 212 and may be used to mount the heat shield assembly 260 to the wheel 210.

Figure 3:
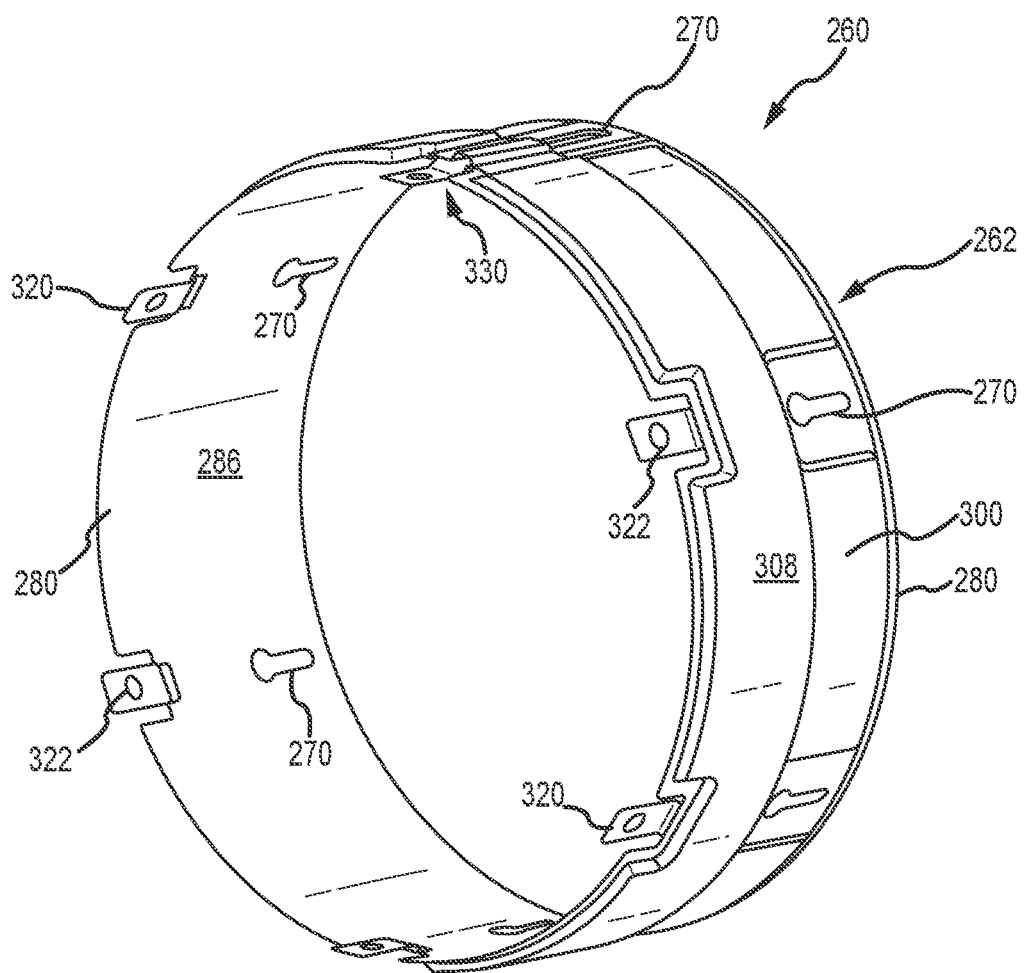
FIG. 3 is a perspective view of a heat shield assembly from the wheel assembly of FIG. 2, in accordance with various embodiments.

A perspective view of the heat shield assembly 260 is presented in FIG. 3. The heat shield assembly 260 includes a plurality of mounting brackets 320 that are spaced about the rotational axis 212 of the wheel assembly 200 (e.g., the mounting brackets 320 may be characterized as being radially spaced about the rotational axis 212). Any appropriate number of mounting brackets 320 may be utilized by the heat shield assembly 260. The heat shield assembly 260 further includes a single bifurcated seam mounting bracket 330. The mounting brackets 320 and the bifurcated seam mounting bracket 330 are used to mount a corresponding torque bar 240 to the wheel 210 to secure a corresponding portion of the heat shield assembly 260 relative to the wheel 210.

FIG. 4A-4D present details of the heat shield assembly 260, including the assembly of the bifurcated seam mounting bracket 330 with a heat shield 262 of the heat shield assembly 260. By way of initial summary, the heat shield 262 is collectively defined by an inner or first heat shield section 280 (e.g., FIG. 4A) and an outer or second heat shield section 300 (e.g., FIG. 4B). At least part of the outer heat shield section 300 (e.g., an inner surface thereof) may be disposed on an outer surface 288 of the inner heat shield section 280. The outer heat shield section 300 may be mounted or fastened to the inner heat shield section 280 at a plurality of locations. "Mounted" or "fastened", as used herein in relation to the heat shield assembly 260, includes welding (e.g., spot welding, tack welding, seam welding), using one or more mechanical fasteners (e.g., rivets), and bonding (e.g., adhesively). In this regard, the outer heat shield section 300 may be mounted to the inner heat shield section 280 at multiple locations along the edges of the heat shield 262 (these edges being spaced along the rotational axis 212 of the wheel assembly 200).

The noted outer surface 288 of the inner heat shield section 280 is disposed radially outward (relative to the rotational axis 212 of the wheel assembly 200) of an inner surface 286 of the inner heat shield section 280 (FIG. 3). Similarly, the outer heat shield section 300 is disposed radially outward (relative to the rotational axis 212 of the wheel assembly 200) of the outer surface 288 of the inner heat shield section 280 (e.g., an outer surface 308 of the outer heat shield section 300 is disposed radially outward, relative to the rotational axis 212 of the wheel assembly 200, of the noted inner surface of the outer heat shield section 300).

As shown in FIG. 4A, the inner heat shield section 280 extends about the rotational axis 212 from a first end 282a to a second end 284a of the inner heat shield section 280. The inner heat shield section 280 may extend less than 360° about the rotational axis 212, such that its first end 282a and second end 284a are spaced from one another by space 264. A first end section 282 of the inner heat shield section 280 includes its first end 282a, while a second end section 284 of the inner heat shield section 280 includes its second end 284a.

The bifurcated seam mounting bracket 330 includes a second or inner bracket section or layer 340 that is shown in FIG. 4A. The inner bracket section 340 in turn includes an outer surface 344 and an inner surface 342 that define a thickness of the inner bracket section 340 (the inner surface 342 being closer to the rotational axis 212 than the outer surface 344). The inner bracket section 340 may be characterized as further including a first section 346 and a second section 348 that may be radially offset from one another or disposed different distances from the rotational axis 212 of the wheel 210 (e.g., the first section 346 may be spaced further from the rotational axis 212 than the second section 348). The outer surface 344 of the first section 346 of the inner bracket section 340 may be disposed against the inner surface 286 of the inner heat shield section 280 (specifically the second end section 284 of the inner heat shield section 280), and the first section 346 may be appropriately mounted or fastened to the second end section 284 of the inner heat shield section 280. The second section 348 of the inner bracket section 340 includes an aperture 350 through which a fastener (e.g., torque bar bolt 236—FIG. 2) may be directed to secure a torque bar 240 and the heat shield assembly 260 to the wheel 210.

FIG. 4A also illustrates a torque bar mounting aperture 270 that extends completely through the heat shield 262 (shown in relation to the inner heat shield section 280 in FIG. 4A). The torque bar mounting aperture 270 includes what may be characterized as an access section 272 and a slot section 274 that extends from the access section 272. The width of the slot section 274 (measured in a circumferential direction or about the rotational axis 212—represented by double-headed arrow A in FIG. 4A) is less than a width of the access section 272 (also measured in the same circumferential direction or about the rotational axis 212). The torque bar mounting aperture 270 is used in the interconnection of a torque bar 240 with the bifurcated seam mounting bracket 330 and to secure/restrain a corresponding portion of the torque bar 240 relative to the wheel 210. The torque bar mounting aperture 270 may be characterized as being "keyhole-shaped."

Figure 4B:
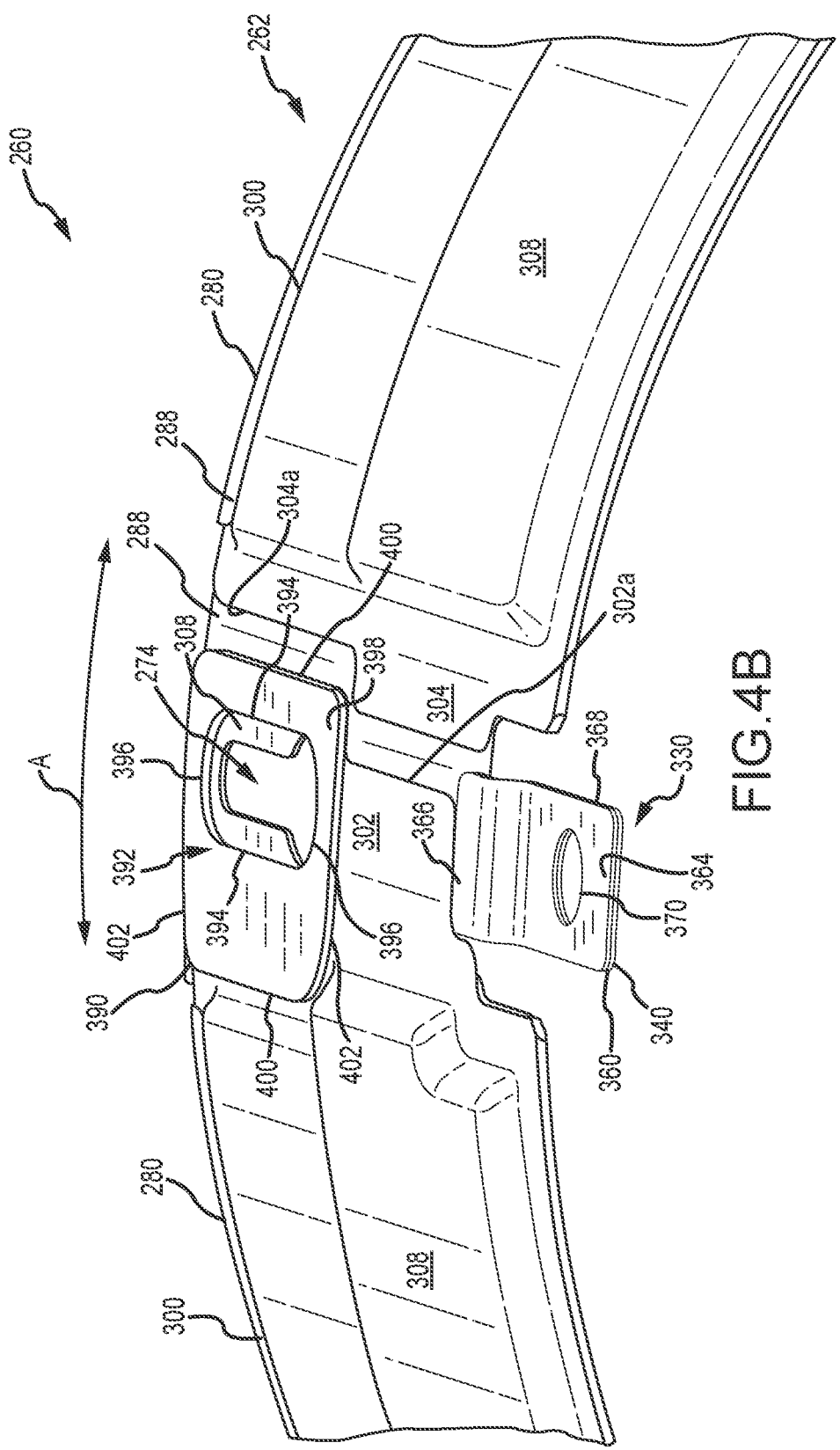
FIG. 4B is a perspective view of a portion of the inner heat shield section and an outer heat shield section of the heat shield, a bifurcated seam mounting bracket, and a reinforcement plate, all in relation to the heat shield assembly of FIG. 3 and in accordance with various embodiments.

FIG. 4B illustrates a first or outer bracket section or layer 360 for the bifurcated seam mounting bracket 330. The outer bracket section 360 includes an outer surface 364 and an inner surface (not shown, but that which interfaces with the outer surface 344 of the inner bracket section 340). The inner surface of the outer bracket section 360 is closer to the rotational axis 212 than its outer surface 364, and the spacing between this inner surface and the outer surface 344 defines a thickness of the outer bracket section 360. The outer bracket section 360 may be characterized as further including a first section 366 and a second section 368 that may be radially offset from one another or disposed different distances from the rotational axis 212 of the wheel 210 (e.g., the first section 366 may be spaced further from the rotational axis 212 than the second section 368). The inner surface of the first section 366 of the outer bracket section 360 may be disposed against the outer surface 288 of the inner heat shield section 280, but the first section 366 of the outer bracket section 360 is not itself mounted/secured to the inner heat shield section 280. The second section 368 of the outer bracket section 360 may be disposed in overlying relation to the second section 348 of the inner bracket section 340 (namely its outer surface 344), and includes an aperture 370 (aligned with the aperture 350 of the inner bracket section 340) through which a fastener (e.g., torque bolt 236—FIG. 2) may be directed to secure a torque bar 240 and the heat shield assembly 260 to the wheel 210. More generally, the outer bracket section 360 may be characterized as being disposed in overlying relation to the inner bracket section 340 (with a portion of the inner heat shield section 280 being disposed between the first section 346 of the inner bracket section 340 and the first section 366 of the outer bracket section 360).

Continuing to refer to FIG. 4B, the outer heat shield section 300 extends about the rotational axis 212 from a first end 302a to a second end 304a of the outer heat shield section 300. The outer heat shield section 300 may extend less than 360° about the rotational axis 212, such that its first end 302a and second end 304a are spaced from one another. A first end section 302 of the outer heat shield section 300 includes its first end 302a, while a second end section 304 of the outer heat shield section 300 includes its second end 304a. The first end section 302 of the outer shield 300 may be mounted to the first end section 282 of the inner heat shield section 280 at one or more locations. Similarly, the second end section 304 of the outer shield 300 may be mounted to the second end section 284 of the inner heat shield section 280 at one or more locations.

The first end section 302 of the outer heat shield section 300 (namely its inner surface, with this inner surface again being radially inward of the noted outer surface 308 of the outer heat shield section 300) is disposed on the outer surface 288 of the first end section 282 of the inner heat shield section 280, with the torque bar mounting aperture 270 also extending through this first end section 302 of the outer heat shield section 300. An end of the first section 366 of the outer bracket section 360 may be disposed adjacent to a corresponding portion of the first end section 302 of the outer heat shield section 300, and with their corresponding outer surfaces 364, 308 being disposed at a common distance from the rotational axis 212 of the wheel assembly 200.

Based upon the foregoing, the heat shield 262 may be characterized as including a first end (collectively including the first end section 282 of the inner heat shield section 280 (and its first end 280a) and the first end section 302 of the outer heat shield section 300 (and its first end 302a)), and as including a second end (collectively including the second end section 284 of the inner heat shield section 280 (and its second end 284a) and the second end section 304 of the outer heat shield section 300 (and its second end 304a)). The bifurcated seam mounting bracket 330 is used in conjunction with these two ends of the heat shield 262 and provides at least two functions. One is that the bifurcated seam mounting bracket 330 is structurally interconnected with each of the two ends of the heat shield 262. Another is that the bifurcated seam mounting bracket 330 accommodates attaching both the heat shield 262 and a corresponding torque bar 240 to the wheel 210.

The heat shield assembly 260 further includes a reinforcement or stiffening plate 390 that is also illustrated in FIG. 4B. The reinforcement plate 390 includes a pair of plate sides 400 that are spaced from one another in the circumferential direction or about the rotational axis 212 (represented by double-headed arrow A in FIG. 4B), as well as a pair of plate ends 402 that are spaced from one another in a dimension that corresponds with the rotational axis 212 for the wheel assembly 200. The reinforcement plate 390 includes a torque bar mounting aperture 392 that is disposed about at least part of the torque bar mounting aperture 270 through the heat shield 262. The torque bar mounting aperture 392 (reinforcement plate 390) and the torque bar mounting aperture 270 (heat shield 262) may be different shapes (e.g., their respective perimeters). For instance the torque bar mounting aperture 392 (reinforcement plate 390) may be oval-shaped and the torque bar mounting aperture 270 (heat shield 262) may be keyhole-shaped.

A thickness of the reinforcement plate 390 extends from an outer surface 398 to an inner surface (not shown) that is positioned on the outer heat shield section 300. This thickness, as well as the spacing between plate sides 400, the spacing between the plate ends 402, and the material for the reinforcement plate 390, may be selected to provide a desired degree of structural reinforcement for the heat shield 262 in the region of the torque bar mounting aperture 270. The reinforcement plate 390 may be appropriately mounted to the outer heat shield section 300 in any appropriate manner (e.g., spot welded; tack welded; seam welded).

At least part of the torque bar mounting aperture 392 through the reinforcement plate 390 is larger than the torque bar mounting aperture 270 through the heat shield 262 so as to expose a corresponding portion of the underlying outer heat shield section 300. In this regard, the torque bar mounting aperture 392 of the reinforcement plate 390 includes a pair of aperture sidewalls 394 that are spaced from one another in the circumferential direction or about the rotational axis 212 (represented by double-headed arrow A in FIG. 4B). The spacing between the aperture sidewalls 394 is greater than the width of the slot section 274 of the torque bar mounting aperture 270 through the heat shield 262 (this "width" being measured in the circumferential direction or about the rotational axis 212—represented by double-headed arrow A in FIG. 4B). As such, the torque bar mounting aperture 392 through the reinforcement plate 390 exposes a portion of the outer heat shield section 300 on each side of slot section 274 of the torque bar mounting aperture 270 through the heat shield 262. That is, one portion of the outer heat shield section 300 extends in a first circumferential direction from one side of the slot section 274 of the torque bar mounting aperture 270 through the heat shield 262 to a location of one of the aperture sidewalls 394 of the torque bar mounting aperture 392 through the reinforcement plate 390, while another portion of the outer heat shield section 300 extends in an opposite second circumferential direction from the opposite side of the slot section 274 of the torque bar mounting aperture 270 through the heat shield 262 to a location of the other of the aperture sidewalls 394 of the torque bar mounting aperture 392 through the reinforcement plate 390.

A pair of aperture end walls 396 for the torque bar mounting aperture 392 through the reinforcement plate 390 are oppositely disposed (and are spaced from each other in a dimension that corresponds with the rotational axis 212 for the wheel assembly 200/wheel 210) and interconnect the aperture sidewalls 394. The corresponding aperture end wall 296 for the torque bar mounting aperture 392 through the reinforcement plate 390 may be spaced beyond the end of the slot section 274 for the torque bar mounting aperture 270 through the heat shield 262 that is opposite the access section 272 for the torque bar mounting aperture 270.

Figure 4C:
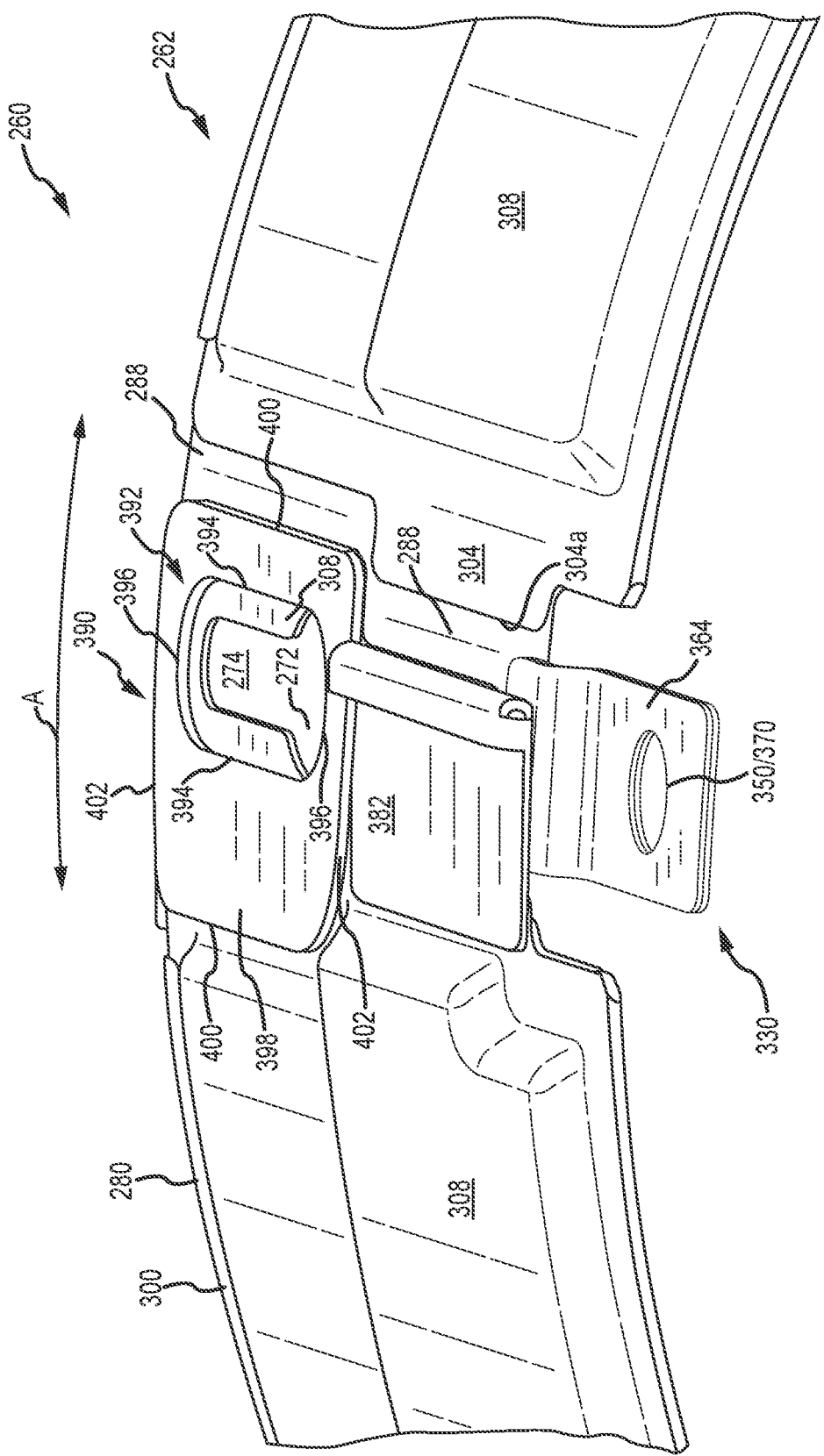
FIG. 4C is a perspective view of the arrangement shown in FIG. 4B in combination with a first seam clasp section that is attached to the heat shield on one side of a heat shield seam, in accordance with various embodiments.

A first seam clasp section 382 may be disposed over and contact the outer surface 364 of at least part of the first section 366 of the outer bracket section 360 for the bifurcated seam mounting bracket 330, and furthermore may be disposed over and contact the outer surface 308 of at least part of the first end section 302 of the outer heat shield section 300, all as shown in FIG. 4C. The first seam clasp section 382 may be mounted to both the first section 366 of the outer bracket section 360 for the bifurcated seam mounting bracket 330, as well as the first end section 302 of the outer heat shield section 300.

Figure 4D:
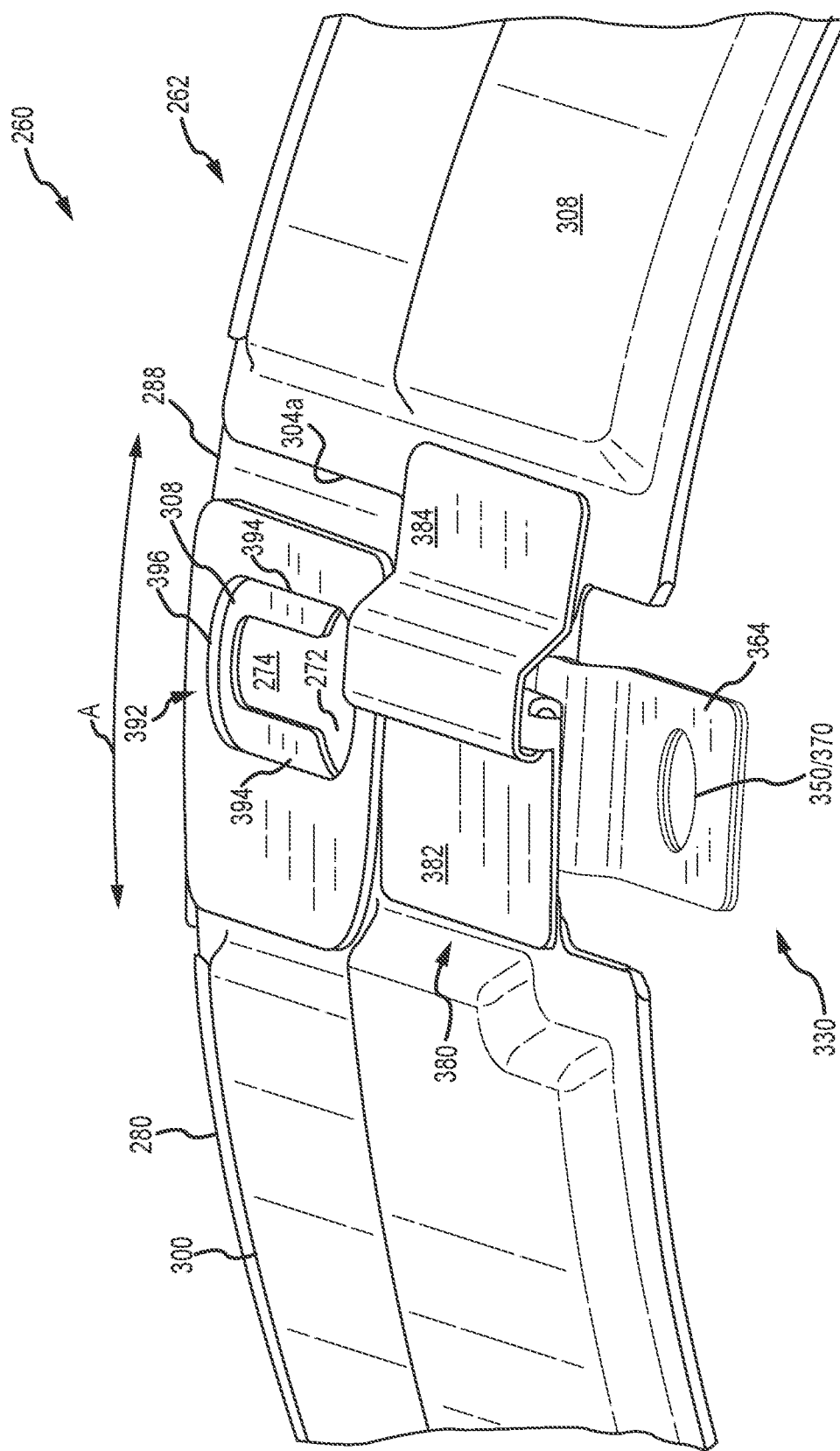
FIG. 4D is a perspective view of the arrangement shown in FIG. 4C in combination with a second seam clasp section that is attached to the heat shield on the opposite side of the heat shield seam and that interlocks with the first seam clasp section, in accordance with various embodiments.
Figure 5B:
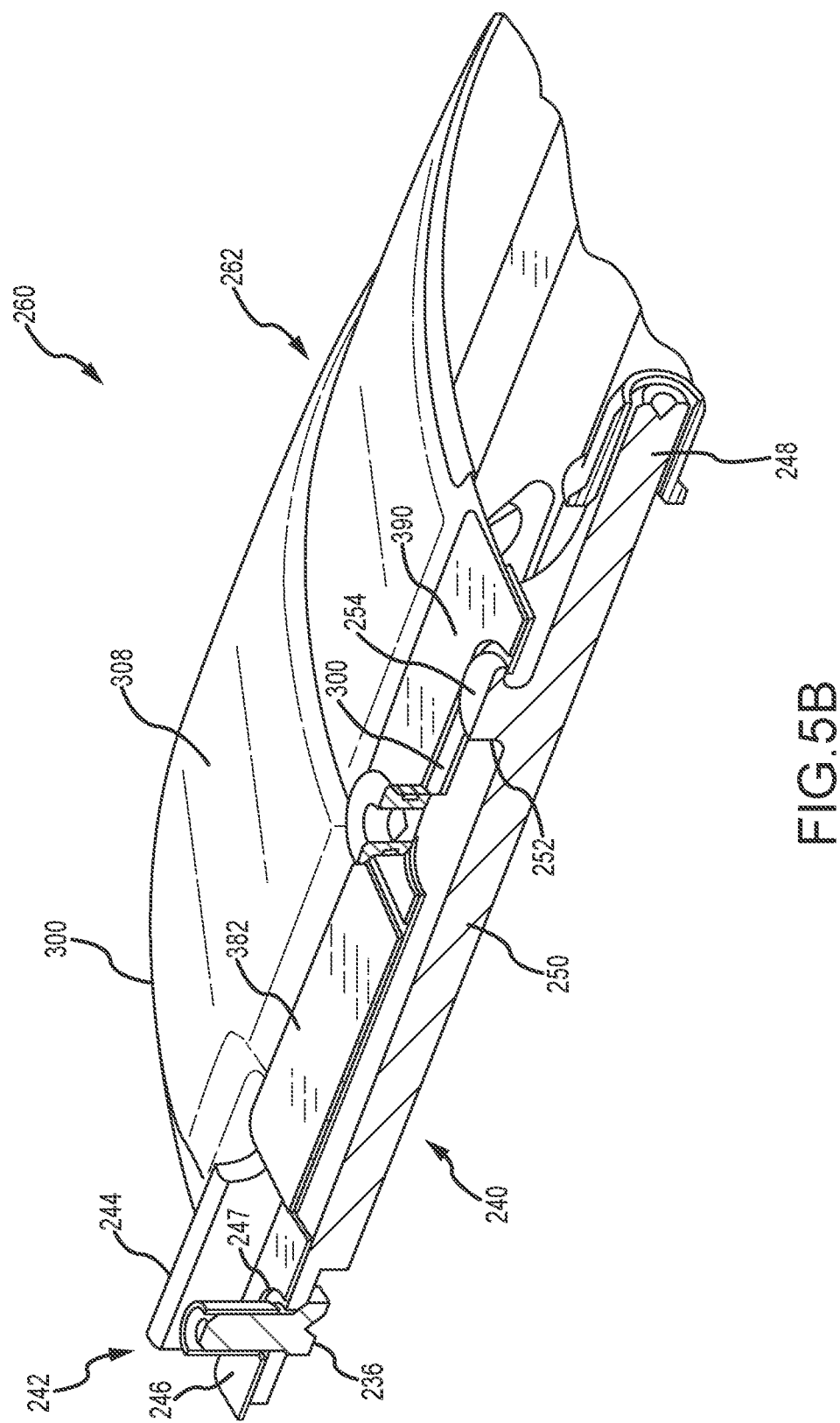
FIG. 5B is a cross-sectional view of the arrangement shown in FIG. 5A, taken along a plane that extends along the rotational axis of the wheel assembly in accordance with various embodiments.
Figure 5C:
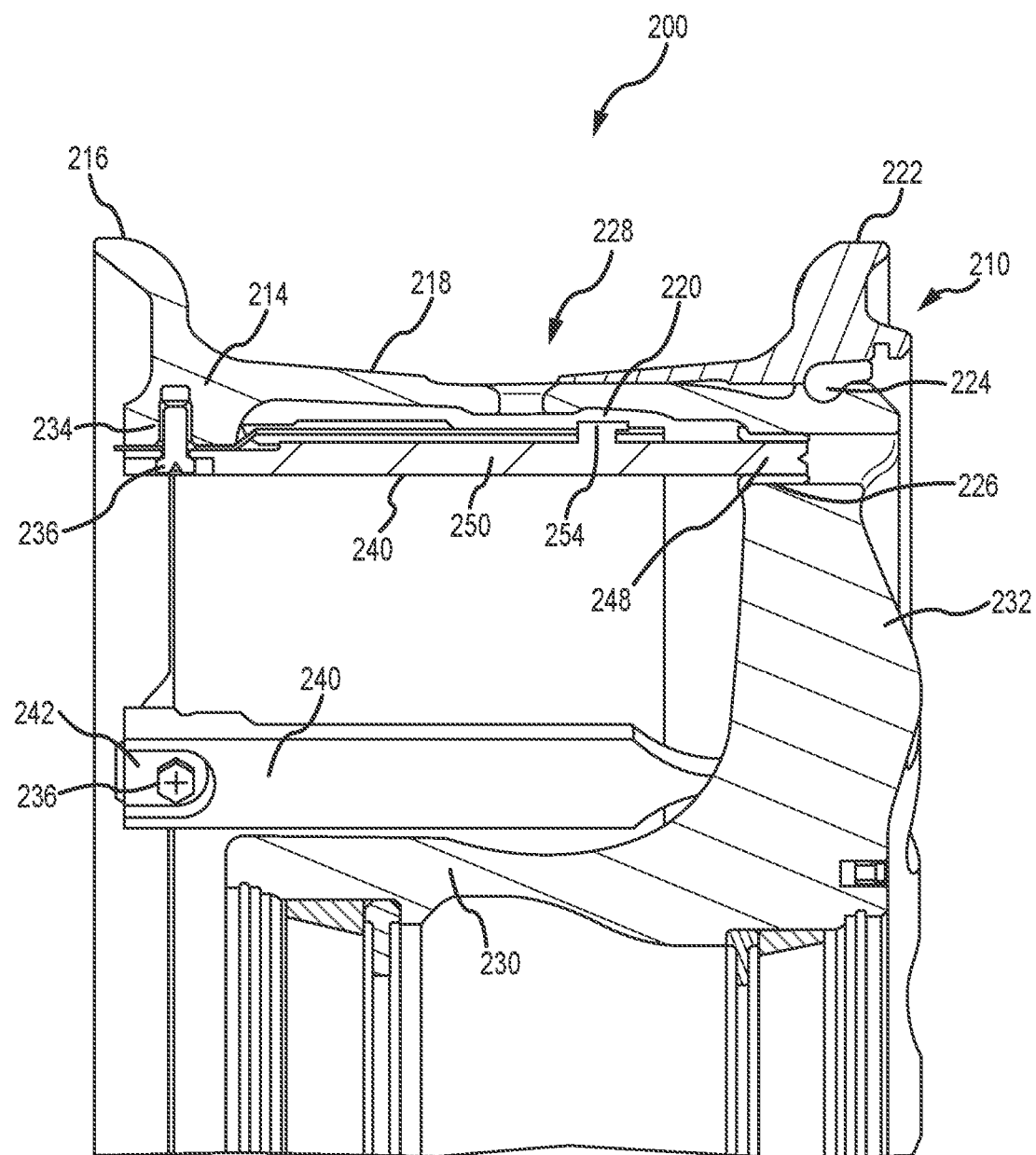
FIG. 5C is a cross-sectional view of a portion of the wheel assembly of FIG. 2, taken along a plane that extends along the rotational axis of the wheel assembly, in accordance with various embodiments.
Figure 5D:
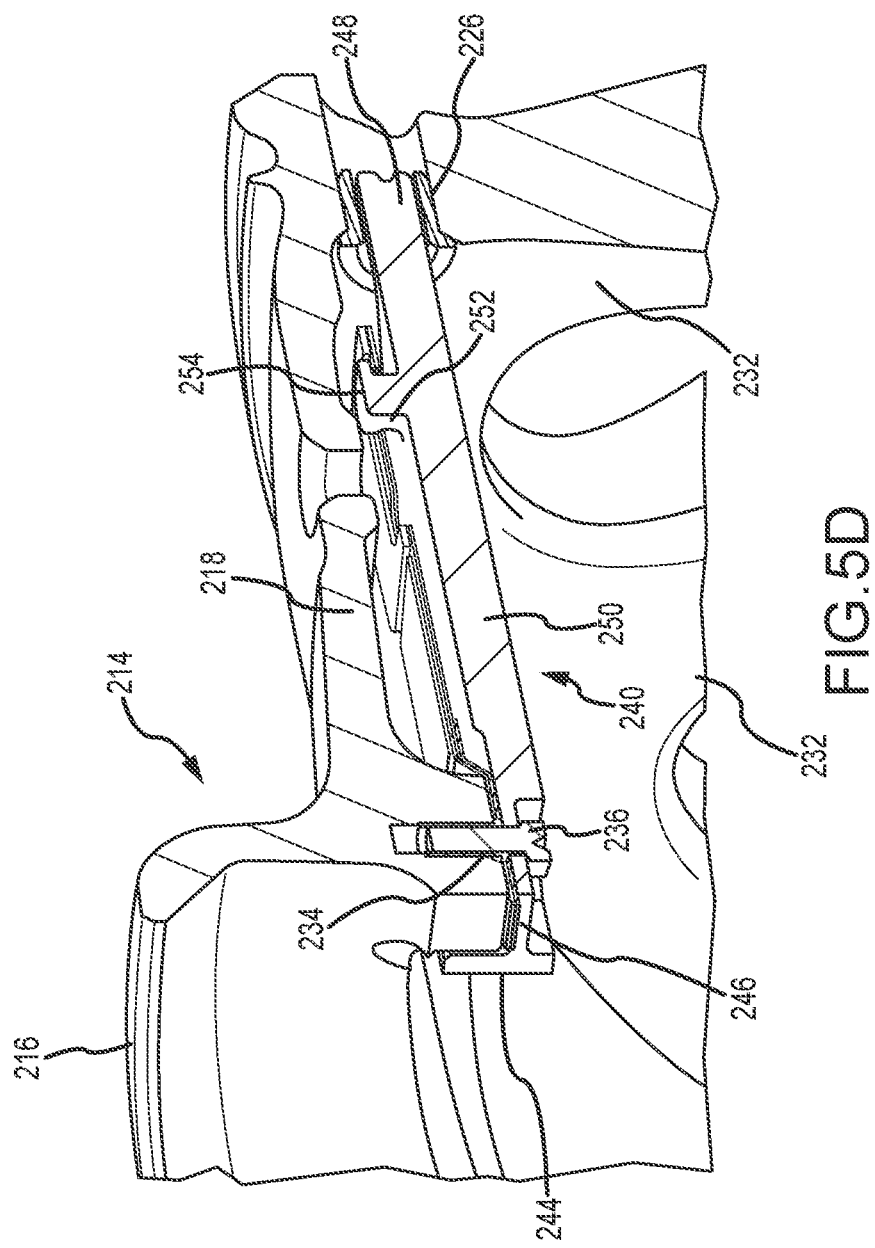
FIG. 5D is a perspective, cross-sectional view of a portion of the wheel of FIG. 2, taken along a plane that extends along the rotational axis of the wheel assembly, in accordance with various embodiments.
Figure 5E:
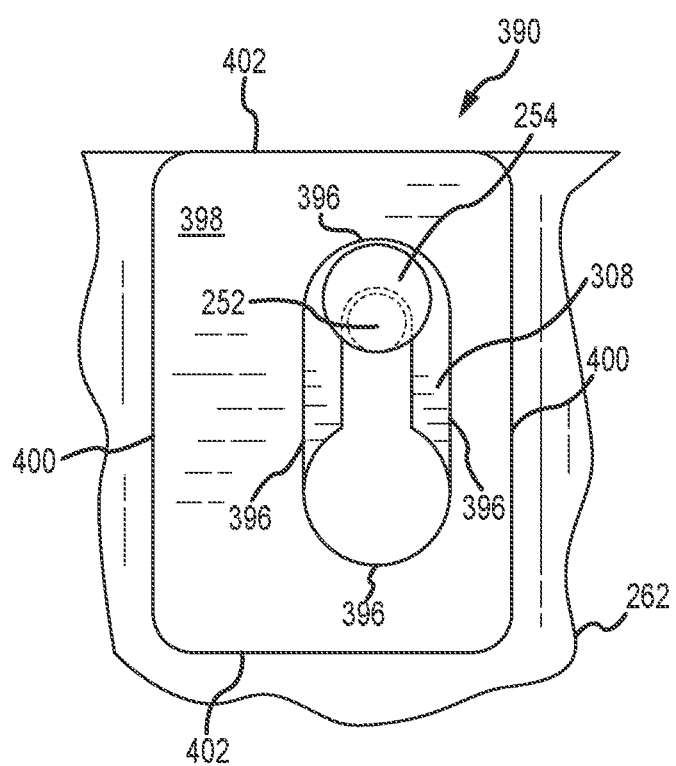
FIG. 5E is an enlarged, plan view of the torque bar mounting aperture through the reinforcement plate for the heat shield assembly of FIG. 3, in accordance with various embodiments.

A second seam clasp section 384 may be disposed over and contact the outer surface 308 of at least part of the second end section 304 of the outer heat shield section 300, as shown in FIG. 4D. The second seam clasp section 384 may be mounted to the second end section 304 of the outer heat shield section 300. The above-noted first seam clasp section 382 and the second seam clasp section 384 collectively define a seam clasp 380. The free ends of the first seam clasp section 382 and the second seam clasp section 384 may be interlocked to define a first configuration for the heat shield assembly 260, where the first seam clasp section 382 and the second seam clasp section 384 are interconnected to interconnect the first end section 282 of the inner heat shield section 280 and the second end section 284 of the inner heat shield section 280, and to also interconnect the first end section 302 of the outer heat shield section 300 and the second end section 304 of the outer heat shield section 300 (e.g., to provide an annular configuration for the heat shield assembly 260). Conversely, the free ends of the first seam clasp section 382 and the second seam clasp section 384 may be disconnected to define a second configuration for the heat shield assembly 260 where the first seam clasp section 382 and the second seam clasp section 384 are disconnected to disconnect the first end section 282 of the inner heat shield section 280 from the second end section 284 of the inner heat shield 280 and to disconnect the first end section 302 of the outer heat shield section 300 from the second end section 304 of the outer heat shield section 300.

As noted, a torque bar 240 may be used to interconnect the heat shield assembly 260 with the wheel 210. Details of both the torque bar 240 and wheel 210 are shown in FIGS. 5A-5E (along with FIG. 2), including in relation to the mounting of the heat shield assembly 260 to the wheel 210. The wheel 210 includes a wheel base 214 having a rim 216 and a body 218. A side rim 222 of the wheel 210 is mounted relative to the wheel base 214 by a lock ring 224. The spacing between the rim 216 and the side rim 222 may be characterized as defining a wheel well 228. In any case, the wheel 210 further includes a hub 230 through which the rotational axis 212 extends, along with a web portion 232 that extends between the hub 230 and the body 218 of the wheel base 214.

Continuing to refer to FIGS. 2 and 5A-5E, the torque bar 240 may be characterized as including a first end section 242 having a mounting wall 246 and a pair of sidewalls 244. What may be characterized as a second end section 248 of the torque bar 240 is disposed opposite this first end section 242 along the length of the torque bar 240. A body 250 of the torque bar 240 extends between the first end section 242 and the second end section 248 of the torque bar 240. The torque bar 240 further includes a stem 252 that extends or protrudes from the body 250 and terminates at a head 254. The head 254 extends beyond an outer perimeter of at least part of the stem 252 (e.g., a width of the head 254 is larger than a width of the stem 252, with each such width being measured in the circumferential direction or about the rotational axis 212—represented by double-headed arrow A in FIG. 5A (as well as FIGS. 4A-4D)).

The head 254 of the torque bar 240 may be directed through the access section 272 of the torque bar mounting aperture 270 through the heat shield 262 such that the underside of the head 254 is either at least generally coplanar with the outer surface 308 of the outer heat shield section 300 of the heat shield 262 or is disposed further from the rotational axis 212 of the wheel assembly 200/wheel 200 than the outer surface 308 of the outer heat shield section 300 of the heat shield 262 (e.g., FIG. 4C). The torque bar 240 may then be moved relative to the heat shield assembly 260 and the wheel 210 (e.g., at least generally parallel to the rotational axis 212 of the wheel assembly 200), and with reference to one or more of FIGS. 5A-5E: 1) to direct the second end section 248 of the torque bar 240 into a torque bar bushing 226 that is mounted/secured to the wheel 210; 2) to dispose the inner surface 342 of the second section 348 (inner bracket section 340 for the bifurcated seam mounting bracket 330) on the mounting wall 246 of the first end section 242 for the torque bar 240; and 3) to position the stem 252 of the torque bar 240 within the slot section 274 of the torque bar mounting aperture 270 of the heat shield 262. Notably, the head 254 of the torque bar 240 is not disposed on the outer surface 398 of the reinforcement plate 390 in the case of the heat shield assembly 260. Instead, the entirety of the head 254 of the torque bar 240 may be positioned between the aperture sidewalls 394 that define part of the perimeter of the torque bar mounting aperture 392 through the reinforcement plate 390 (the outer surface of the head 254 also may not protrude beyond the outer surface 398 of the reinforcement plate 390). The underside of the head 254 of the torque bar 240 is instead disposed in overlying relation to the outer surface 308 of the outer heat shield section 300 (and may engage this portion of the outer surface 308). With the torque bar 240 being in this configuration, a torque bar bolt 236 may be directed into and through an aperture 247 through the mounting wall 246 of the torque bar 240, through the apertures 350, 370 of the bifurcated seam mounting bracket 330, and into a corresponding torque bar mount 234 of the wheel 210. Activation of this torque bar bolt 236 mounts/secures the heat shield 262 and the corresponding torque bar 240 to the wheel 210, and furthermore may compress together the inner bracket section 340 and the outer bracket section 360 of the bifurcated seam mounting bracket 330 (e.g., via compression of the second section 348 (inner bracket section 340) and the second section 368 (outer bracket section 360)).

The heat shield assembly 260 again includes a plurality of mounting brackets 320 (e.g., FIGS. 2-3) that are each appropriately mounted or secured to the heat shield 262 (e.g., welded). Each mounting bracket 320 has a corresponding aperture 322 and each mounting bracket 320 has a corresponding torque bar mounting aperture 270 that extends through the heat shield 262. The aperture 322 of each mounting bracket 320 and its corresponding torque bar mounting aperture 270 (that extends through the heat shield 262) may be disposed along an axis that is parallel to the rotational axis 212 of the wheel assembly 200. A torque bar 240 may interact with a mounting bracket 320 and its corresponding torque bar mounting aperture 270 through the heat shield 262 in the same generally manner discussed above with regard to the bifurcated seam mounting bracket 330 such that the heat shield 262 is mounted/secured to the wheel 210 at a plurality of different locations that are radially spaced about the rotational axis 212 (where these locations coincide with a mounting bracket 320). Although not shown, a reinforcement plate 390 could be provided for each torque bar mounting aperture 270 through the heat shield 262.

There are a number of points of note with regard to the wheel assembly 200 in relation to the head shield assembly 260. One note is that the two ends of the heat shield 262 are each fixed or anchored relative to the bifurcated seam mounting bracket 330. This allows for reduced plastic strain in the heat shield assembly 260 at least when installed on the wheel 210, and furthermore may reduce deflection of the heat shield assembly 260 (such deflection may cause abrasion if the heat shield assembly 260 contacts corresponding portions of the wheel 210). The inner bracket section 340 of the bifurcated seam mounting bracket 330 is mounted directly to one end of the heat shield 262 (via the inner bracket section 340 of the bifurcated seam mounting bracket 330 being mounted to the inner surface 286 of the second end section 284 for inner heat shield section 280). The outer bracket section 360 of the bifurcated seam mounting bracket 330 is indirectly mounted to the other end of the heat shield 262. That is, the outer bracket section 360 is mounted directly to the first seam clasp section 382 of the seam clasp 380, and this same first seam clasp section 382 is mounted directly to the outer surface 308 of the first end section 302 of the outer heat shield section 300. As such, the outer bracket section 360 of the bifurcated seam mounting bracket 330 is indirectly mounted to the outer surface 308 of the first end section 302 of the outer heat shield section 300 (where the first end section 302 of the outer heat shield section 300 may be mounted directly to the first end section 282 for the inner shield section 280).

As noted above, the head 254 of the torque bar 240 is not disposed on the outer surface 398 of the reinforcement plate 390 in the case of the heat shield assembly 260. Instead, the entirety of the head 254 of the torque bar 240 is positioned between the aperture sidewalls 394 for the torque bar mounting aperture 392 of the reinforcement plate 390, and the underside of the head 254 of the torque bar 240 is instead disposed in overlying relation to the outer heat shield section 300 of the heat shield 262. This is particularly advantageous for the case of a smaller open space 220 (e.g. FIG. 5C) between the body 218 of the wheel base 214 and the outer surface 398 of the reinforcement plate 390 (e.g., the size of the open space 220 may not accommodate disposing the underside of the head 254 of the torque bar 240 on the outer surface 398 of the reinforcement plate 390).

Figure 6:
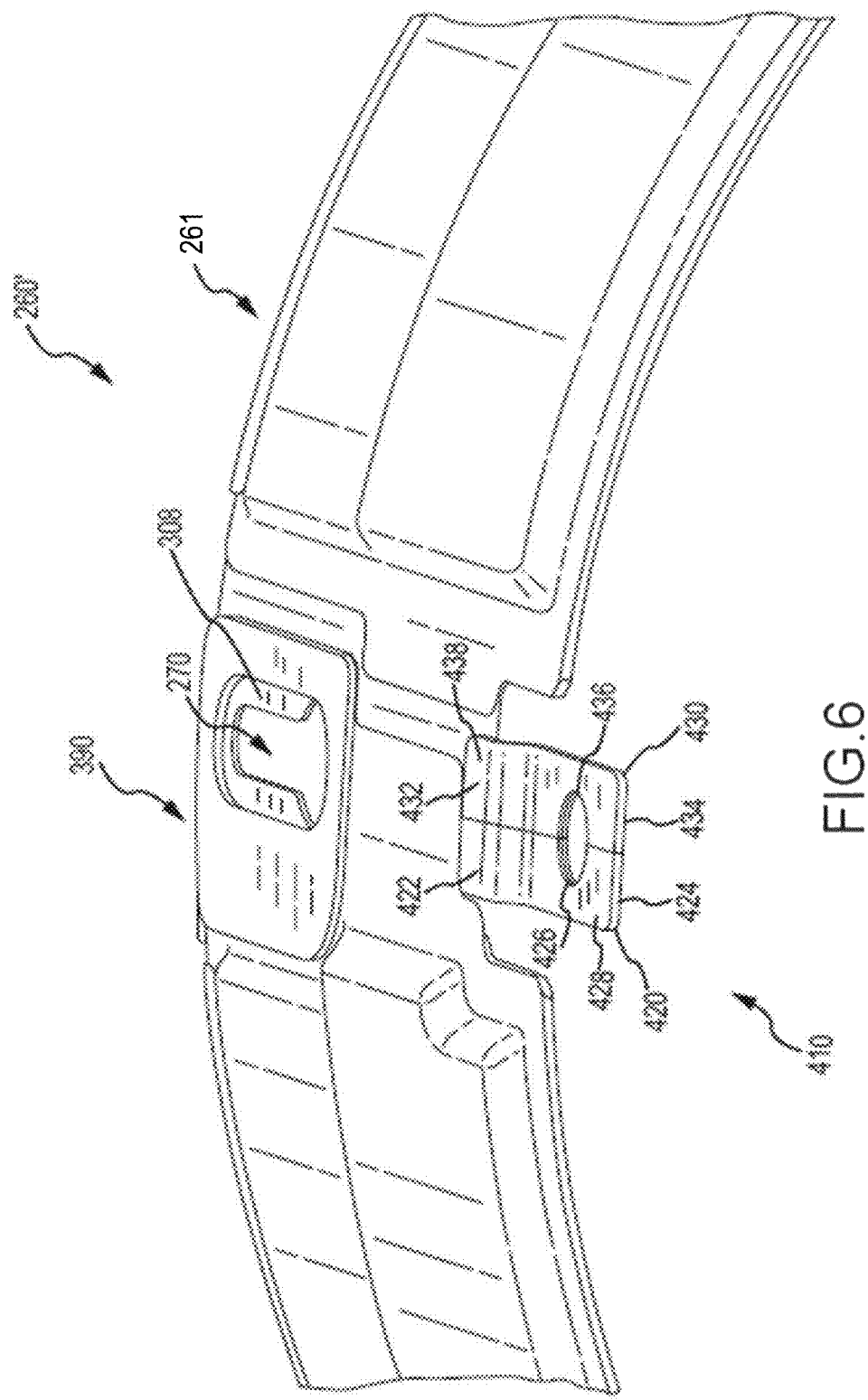
FIG. 6 is a perspective view of a bifurcated seam mounting bracket for a heat shield assembly, in accordance with various embodiments.

A bifurcated seam mounting bracket is illustrated in FIG. 6, is identified by reference numeral 410, and may be used in place of the above-noted bifurcated seam mounting bracket 330 (e.g., to define a heat shield assembly 260'). The discussion of the heat shield assembly 260 presented above applies to the heat shield assembly 260' unless otherwise noted. The bifurcated seam mounting bracket 410 includes a first bracket section 420 and a separate second bracket section 430 that are disposed alongside each other (or in "side-by-side" relation to one another relative to/about the rotational axis 212 of the wheel assembly 200). The first bracket section 420 includes an outer surface 428 and an inner surface (not shown) that are spaced from one another to define a thickness of the first bracket section 420 (the inner surface of the first bracket section 420 being closer to the rotational axis 212 than the outer surface 428). The first bracket section 420 may be characterized as including a first section 422 and a second section 424 that may be radially offset from one another or disposed different distances from the rotational axis 212 of the wheel 210 (e.g., the first section 422 may be spaced further from the rotational axis 212 than the second section 424). The inner surface of the first section 422 of the first bracket section 420 may be disposed against the outer surface 288 of the inner heat shield section 280 (specifically the second end section 284 of the inner heat shield section 280). However, the first section 422 of the first bracket section 420 is not mounted to the second end section 284 of the inner heat shield section 280. Instead, the first seam clasp section 382 of the seam clasp 380 is mounted to both the first bracket section 420 and to the first end section 302 of the outer heat shield section 300. The second section 424 of the first bracket section 420 includes an aperture section or cutout 426.

The second bracket section 430 may be the mirror image of the first bracket section 420. In any case, the second bracket section 430 includes an outer surface 438 and an inner surface (not shown) that are spaced from one another to define a thickness of the second bracket section 430 (the inner surface of the second bracket section 430 being closer to the rotational axis 212 than the outer surface 438). The second bracket section 430 may be characterized as including a first section 432 and a second section 434 that may be radially offset from one another or disposed different distances from the rotational axis 212 of the wheel 210 (e.g., the first section 432 may be spaced further from the rotational axis 212 than the second section 434). The inner surface of the first section 432 of the second bracket section 430 may be disposed against the outer surface 288 of the inner heat shield section 280 (specifically at the second end section 284 of the inner heat shield section 280), and the first section 432 may be mounted to the inner heat shield section 280.

The second section 434 of the second bracket section 430 includes an aperture section or cutout 436. This aperture section 436 of the second bracket section 430 and the aperture section 426 of the first bracket section 420 collectively define an aperture through which a fastener (e.g., torque bar bolt 236—FIG. 2) may be directed to secure a torque bar 240 and the heat shield assembly 260' to the wheel 210. In this case the torque bar bolt 236 may separately compress the second section 424 (first bracket section 420) and the second section 434 (second bracket section 430) against the torque bar mount 234 of the wheel 210.

The two ends of the heat shield 261 are each fixed or anchored relative to the bifurcated seam mounting bracket 410. This allows for reduced plastic strain in the heat shield assembly 260' at least when installed on the wheel 210, and furthermore reduces deflection of the heat shield assembly 260 (such deflection may cause abrasion if the heat shield assembly 260 contacts corresponding portions of the wheel 210). The second bracket section 430 of the bifurcated seam mounting bracket 410 is directly mounted to one end of the heat shield 261 (via the second bracket section 430 of the bifurcated seam mounting bracket 410 being mounted to the outer surface 288 of the second end section 284 for inner heat shield section 280). The first bracket section 420 of the bifurcated seam mounting bracket 410 is indirectly mounted to the other end of the heat shield 261. That is, the first bracket section 420 of the bifurcated seam mounting bracket 410 is directly mounted to the first seam clasp section 382 of the seam clasp 380, and this same first seam clasp section 382 is directly mounted to the outer surface 308 of the first end section 302 of the outer heat shield section 300. As such, the first bracket section 420 of the bifurcated seam mounting bracket 410 is indirectly mounted to the outer surface 308 of the first end section 302 of the outer heat shield section 300 (where the first end section 302 of the outer heat shield section 300 may be mounted directly to the first end section 282 for the inner heat shield section 280).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A heat shield assembly comprising:
   a heat shield comprising a first heat shield end and a second heat shield end; and
   a seam mounting bracket comprising a first bracket section and a separate second bracket section, wherein said first bracket section is maintained in a fixed position relative to said first heat shield end and said second bracket section is maintained in a fixed position relative to said second heat shield end, wherein said first bracket section and said second bracket section are disposed in side-by-side relation, wherein said first bracket section and said second bracket section each comprise a fastener aperture section, and wherein said fastener aperture section of said first bracket section adjoins said fastener aperture section of said second bracket section to collectively define a single fastener aperture.

2. The heat shield assembly of claim 1, wherein said first bracket section is disposed in overlying relation to said second bracket section.

3. The heat shield assembly of claim 2, wherein said first bracket section and said second bracket section each comprise a fastener aperture, wherein said fastener aperture of said first bracket section is aligned with said fastener aperture of said second bracket section.

4. The heat shield assembly of claim 1, wherein said heat shield comprises an inner heat shield section and an outer heat shield section.

5. A heat shield assembly comprising:
   a heat shield comprising:
      an inner heat shield section comprising a first inner heat shield end and a second inner heat shield end, wherein said inner heat shield section extends about a reference axis proceeding from said first inner heat shield end to said second inner heat shield end; and
      an outer heat shield section positioned radially outwardly, relative to said reference axis, of said inner heat shield section, comprising a first outer heat shield end and a second outer heat shield end, and further comprising an outer surface, wherein said outer heat shield section extends about said reference axis proceeding from said first outer heat shield end to said second outer heat shield end;
   a seam mounting bracket comprising a first bracket section and a separate second bracket section, wherein said second bracket section is mounted to said inner heat shield section at a second end section of said inner heat shield section that comprises said second inner heat shield end; and
   a seam clasp comprising a first seam clasp section and a second seam clasp section, wherein said first seam clasp section is disposed on both said outer surface of a first end section of said outer heat shield section that comprises said first outer heat shield end and an outer surface of at least part of said first bracket section, wherein said first seam clasp section is mounted to each of said outer heat shield section and said first bracket section, wherein said second seam clasp section is disposed on said outer surface of a second end section of said outer heat shield section that comprises said second outer heat shield end, and wherein said second seam clasp section is mounted to said outer heat shield section.

6. The heat shield assembly of claim 5, wherein said first bracket section is disposed in overlying relation to said second bracket section, and wherein said second bracket section is attached to an inner surface of said inner heat shield section.

7. The heat shield assembly of claim 6, wherein said first bracket section and said second bracket section each comprise a fastener aperture, wherein said fastener aperture of said first bracket section is aligned with said fastener aperture of said second bracket section.

8. The heat shield assembly of claim 5, wherein said first bracket section and said second bracket section are disposed in side-by-side relation, wherein said second bracket section is attached to an outer surface of said inner heat shield section, and wherein said first bracket section disposed on said outer surface of said inner heat shield section.

9. The heat shield assembly of claim 8, wherein said first bracket section and said second bracket section each comprise a fastener aperture section, wherein said fastener aperture section of said first bracket section adjoins said fastener aperture section of said second bracket section to define a single fastener aperture.

10. The heat shield assembly of claim 5, further comprising:
a first configuration where said first seam clasp section and said second seam clasp section are interconnected to interconnect a first end section of said inner heat shield section and said second end section of said inner heat shield section and to interconnect said first end section of said outer heat shield section and said second end section of said outer heat shield section, said first end section of said inner heat shield comprising said first inner heat shield end; and
a second configuration where said first seam clasp section and said second seam clasp section are disconnected to disconnect said first end section of said inner heat shield section from said second end section of said inner heat shield section and to disconnect said first end section of said outer heat shield section from said second end section of said outer heat shield section.

11. The heat shield assembly of claim 5, wherein said first inner heat shield end and said second inner heat shield end are spaced from one another such that said inner heat shield section does not extend a full 360° about said reference axis, and wherein said first outer heat shield end and said second outer heat shield end are spaced from one another such that said outer heat shield section does not extend a full 360° about said reference axis.

12. A wheel assembly comprising a wheel and the heat shield assembly of claim 5, wherein said heat shield assembly is detachably connected to said wheel.

13. A method of assembling a heat shield assembly comprising an inner heat shield section and an outer heat shield section, said inner heat shield section comprising a first inner heat shield end and a second inner heat shield end, wherein said inner heat shield section extends about a reference axis proceeding from said first inner heat shield end to said second inner heat shield end, said outer heat shield section being positioned radially outwardly, relative to said reference axis, of said inner heat shield section, comprising a first outer heat shield end and a second outer heat shield end, and further comprising an outer surface, wherein said outer heat shield section extends about said reference axis proceeding from said first outer heat shield end to said second outer heat shield end, said method comprising:
mounting a second bracket section to a second end section of said inner heat shield section that comprises said second inner heat shield end;
disposing a first seam clasp section on both said outer surface of a first end section of said outer heat shield section that comprises said first outer heat shield end and an outer surface of at least part of a first bracket section;
mounting said first seam clasp section to each of said outer heat shield section and said first bracket section;
disposing a second seam clasp section on said outer surface of a second end section of said outer heat shield section that comprises said second outer heat shield end; and
mounting said second seam clasp section to said outer heat shield section.

14. The method of claim 13, further comprising:
disposing an outer surface of said second bracket section against an inner surface of said second end section of said inner heat shield section prior to said mounting a second bracket section; and
disposing said first bracket section in overlying relation to said second bracket section after said mounting a second bracket section.

15. The method of claim 14, further comprising:
disposing an inner surface of said first bracket section on an outer surface of said second end section of said inner heat shield section prior to said disposing a first seam clasp section.

16. The method of claim 13, further comprising:
disposing an inner surface of said second bracket section against an outer surface of said second end section of said inner heat shield section prior to said mounting a second bracket section; and
disposing said first bracket section at least generally alongside said second bracket section after said mounting a second bracket section.

17. The method of claim 16, further comprising:
disposing an inner surface of said first bracket section on an outer surface of said second end section of said inner heat shield section prior to said disposing a first seam clasp section.

18. The method of claim 13, wherein said mounting a second bracket section, said mounting said first seam clasp section, and said mounting said second seam clasp section each comprise welding.

* * * * *